US012689026B2

(12) United States Patent
Xu et al.

(10) Patent No.: US 12,689,026 B2
(45) Date of Patent: Jul. 21, 2026

(54) METHOD FOR SIMULTANEOUSLY FORMING ALKALI METAL LAYERS

(71) Applicants: GM GLOBAL TECHNOLOGY OPERATIONS LLC, Detroit, MI (US); THE REGENTS OF THE UNIVERSITY OF MICHIGAN, Ann Arbor, MI (US)

(72) Inventors: Shaomao Xu, Sterling Heights, MI (US); Ming Wang, Sterling Heights, MI (US); Ryan Curtis Sekol, Grosse Pointe Woods, MI (US); Xiaowei Yu, Troy, MI (US); Erik Damon Huemiller, Troy, MI (US); Catherine Haslam, Ann Arbor, MI (US); Jeffrey S. Sakamoto, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 682 days.

(21) Appl. No.: 18/115,429

(22) Filed: Feb. 28, 2023

(65) Prior Publication Data

US 2024/0290950 A1 Aug. 29, 2024

(51) Int. Cl.
| | |
|---|---|
| *H01M 4/134* | (2010.01) |
| *H01M 4/04* | (2006.01) |
| *H01M 4/36* | (2006.01) |
| *H01M 4/40* | (2006.01) |

(52) U.S. Cl.
CPC ......... *H01M 4/366* (2013.01); *H01M 4/0435* (2013.01); *H01M 4/0471* (2013.01); *H01M 4/0483* (2013.01); *H01M 4/405* (2013.01)

(58) Field of Classification Search
None
See application file for complete search history.

(56) References Cited

U.S. PATENT DOCUMENTS

| | | | |
|---|---|---|---|
| 2007/0143989 A1 | 6/2007 | Polsonetti et al. | |
| 2019/0144982 A1 | 5/2019 | Veg et al. | |
| 2021/0060638 A1 | 3/2021 | Herle | |
| 2022/0271264 A1 | 8/2022 | Xu et al. | |

OTHER PUBLICATIONS

U.S. Appl. No. 17/970,659, filed Oct. 21, 2022, Yaoyu Ren et al., entitled Method for Coating a Metal Layer such as Lithium Metal on a Web such as a Current Collector Foil.

*Primary Examiner* — Yoshitoshi Takeuchi

(57) ABSTRACT

A method for simultaneously forming alkali metal layers includes heating a laminate structure including a top layer, a bottom layer, and an alkali metal layer sandwiched between opposing facing surfaces of the top layer and the bottom layer. The laminate structure is heated to a peel temperature to at least partially melt the alkali metal layer and form a volume of molten alkali metal at the location of a peel site within the alkali metal layer. The top layer and the bottom layer apart from each other such that the alkali metal layer splits internally at the location of the peel site and is divided between the top layer and the bottom layer.

20 Claims, 3 Drawing Sheets

METHOD FOR SIMULTANEOUSLY FORMING ALKALI METAL LAYERS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electrochemical cells that cycle alkali metal ions, and more particularly to methods for simultaneously forming alkali metal layers that may be used as negative electrodes in electrochemical cells that cycle alkali metal ions.

Electrochemical cells that cycle lithium ions generally include a negative electrode and a positive electrode disposed on opposite sides of a porous separator and an electrolyte that provides a medium for the conduction of lithium ions between the negative and positive electrodes during discharge and charge of the electrochemical cell. The electrodes are oftentimes supported on metal current collectors that are electrically coupled to one another outside the electrochemical cell via an external circuit. The current collectors provide an electron transport path between the electrodes and the external circuit. To ensure the fast and efficient transfer of electrons to and from the electrodes during charge and discharge of the electrochemical cell, it is generally desirable to maintain good contact between the electrodes and their respective current collectors.

Lithium metal is a desirable negative electrode material for secondary lithium metal batteries due to its high specific capacity (3,860 mAh/g) and low reduction potential (−3.04 V versus the standard hydrogen electrode). When lithium metal is used as a negative electrode material, a thin layer of lithium is oftentimes applied to a thin metal current collector foil prior to assembly of the electrochemical cell.

It may be desirable to develop a method that can be used to effectively form lithium metal layers that can be used as lithium metal negative electrode layers in electrochemical cells that cycle lithium ions.

SUMMARY

In a method for simultaneously forming alkali metal layers, a laminate structure is heated to a peel temperature. The laminate structure comprises a top layer, a bottom layer, and an alkali metal layer sandwiched between opposing facing surfaces of the top layer and the bottom layer. The laminate structure is heated to at least partially melt the alkali metal layer and form a volume of molten alkali metal at the location of a peel site within the alkali metal layer. The top layer and the bottom layer are peeled apart from each other such that the alkali metal layer splits internally at the location of the peel site and is divided between the top layer and the bottom layer.

The laminate structure may be heated such that the volume of molten alkali metal formed within the alkali metal layer extends through the entire alkali metal layer and wets the opposing facing surfaces of the top layer and the bottom layer.

The alkali metal layer may comprise lithium. In such case, the laminate structure may be heated to a peel temperature greater than or equal to about 180 degrees Celsius to less than or equal to about 200 degrees Celsius.

When the top layer and the bottom layer are peeled apart from each other, adhesive forces between the alkali metal layer and the opposing facing surfaces of the top layer and the bottom layer may be greater than cohesive forces within the volume of molten alkali metal such that cohesive failure occurs within the alkali metal layer itself at the location of the peel site and adhesive failure does not occur along an interface between the alkali metal layer and the top layer or along an interface between the alkali metal layer and the bottom layer.

In aspects, at least one of the top layer or the bottom layer may be in the form of a foil comprising a metal selected from the group consisting of copper, nickel, titanium, and stainless steel.

In aspects, at least one of the top layer or the bottom layer may be in the form of a release film comprising a polymer.

The method may further comprise forming a surface treatment layer on the facing surface of at least one of the top layer or the bottom layer. The surface treatment layer may comprise metal, a metal oxide, a polymer, or a combination thereof.

The method may further comprise applying a volume of alkali metal to the facing surface of the top layer and/or the bottom layer, and laminating the top layer and the bottom layer together to form the laminate structure. The top layer and the bottom layer may be laminated together by simultaneously passing the top layer, the bottom layer, and the volume of alkali metal between rollers spaced apart by a gap.

The volume of alkali metal may be in solid phase when the top layer and the bottom layer are laminated together.

When the alkali metal layer splits internally at the location of the peel site, the alkali metal layer may be simultaneously divided into a first alkali metal layer disposed on the top layer and a second alkali metal layer disposed on the bottom layer.

The top layer and the bottom layer may each have a thickness of greater than or equal to about 5 micrometers to less than or equal to about 30 micrometers. The alkali metal layer may have a thickness of greater than or equal to about 1 micrometer to less than or equal to about 60 micrometers. The first and second alkali metal layers may each have a thickness of greater than or equal to about 1 micrometer to less than or equal to about 30 micrometers.

When the top layer and the bottom layer are peeled apart from each other, the laminate structure may be oriented such that the opposing facing surfaces of the top layer and the bottom layer open away from a direction of gravitational force.

The top layer and the bottom layer each may be in the form of a continuous web extending between inlet rollers and outlet rollers. In such case, the method may further comprise continuously moving the top layer and the bottom layer between the inlet rollers and the outlet rollers.

In another method for forming alkali metal layers, a first laminate structure is formed by positioning a facing surface of a top layer opposite a facing surface of a bottom layer, applying a volume of alkali metal between the facing surfaces of the top layer and the bottom layer, and simultaneously passing the top layer, the bottom layer, and the volume of alkali metal between a first set of rollers to transform the volume of alkali metal into a first alkali metal layer sandwiched between the facing surfaces of the top layer and the bottom layer. The first laminate structure is heated to a peel temperature to at least partially melt the first alkali metal layer and form a volume of molten alkali metal at the location of a first peel site disposed between the top layer and the bottom layer within the first alkali metal layer. The top layer and the bottom layer are peeled apart from each other such that the first alkali metal layer splits internally at the location of the first peel site and is divided into a second alkali metal layer disposed on the top layer and a third alkali metal layer disposed on the bottom layer.

At least one of the top layer or the bottom layer may be in the form of a foil comprising a metal selected from the group consisting of copper, nickel, titanium, and stainless steel.

The first alkali metal layer may comprise lithium. In such case, the first laminate structure may be heated to a peel temperature greater than or equal to about 180 degrees Celsius to less than or equal to about 200 degrees Celsius.

The method may further comprise forming a second laminate structure by positioning a facing surface of a third layer opposite the third alkali metal layer and the facing surface of the bottom layer, and simultaneously passing the third layer, the third alkali metal layer, and the bottom layer between a second set of rollers such that the third alkali metal layer is sandwiched between the facing surface of the third layer and the facing surface of the bottom layer. The second laminate structure may be heated to the peel temperature to at least partially melt the third alkali metal layer and form a volume of molten alkali metal at the location of a second peel site between the third layer and the bottom layer within the third alkali metal layer. The third layer and the bottom layer may be peeled apart from each other such that the third alkali metal layer splits internally at the location of the second peel site and is divided into a fourth alkali metal layer disposed on the third layer and a fifth alkali metal layer disposed on the bottom layer.

Prior to forming the second laminate structure, the facing surface of the third layer may be substantially bare and may not include an overlying alkali metal layer. A thickness of the third alkali metal layer may be greater than that of the fourth alkali metal layer and of the fifth alkali metal layer.

The top layer, the bottom layer, and the third layer each may be in the form of a continuous web extending at least partway between inlet rollers and outlet rollers. In such case, the method may further comprise continuously moving the bottom layer between the inlet rollers and the outlet rollers.

In yet another method for forming alkali metal layers, a first laminate structure is formed by positioning a facing surface of a top layer opposite a facing surface of a bottom layer. A first alkali metal layer is disposed along the facing surface of the bottom layer. The facing surface of the top layer is substantially bare and may not include an overlying alkali metal layer. The top layer, the first alkali metal layer, and the bottom layer are simultaneously passed between a first set of rollers such that the first alkali metal layer is sandwiched between the facing surface of the top layer and the facing surface of the bottom layer. The first laminate structure is heated to a peel temperature to at least partially melt the first alkali metal layer and form a volume of molten alkali metal at the location of a peel site between the top layer and the bottom layer within the first alkali metal layer. The top layer and the bottom layer are peeled apart from each other such that the first alkali metal layer splits internally at the location of the peel site and is divided into a second alkali metal layer disposed on the top layer and a third alkali metal layer disposed on the bottom layer. The second alkali metal layer and the third alkali metal layer each have a thickness of greater than or equal to about 25% to less than or equal to about 75% of the thickness of the first alkali metal layer.

The method may further comprise forming a second laminate structure by positioning a facing surface of a third layer opposite the third alkali metal layer and the facing surface of the bottom layer. The facing surface of the third layer may be substantially bare and may not include an overlying alkali metal layer. The third layer, the third alkali metal layer, and the bottom layer may be simultaneously passed between a second set of rollers such that the third alkali metal layer is sandwiched between the facing surface of the third layer and the facing surface of the bottom layer. The second laminate structure may be heated to the peel temperature to at least partially melt the third alkali metal layer and form a volume of molten alkali metal at the location of a second peel site between the third layer and the bottom layer within the third alkali metal layer. The third layer and the bottom layer may be peeled apart from each other such that the third alkali metal layer splits internally at the location of the second peel site and is divided into a fourth alkali metal layer disposed on the third layer and a fifth alkali metal layer disposed on the bottom layer. The fourth alkali metal layer and the fifth alkali metal layer each may have a thickness of greater than or equal to about 25% to less than or equal to about 75% of the thickness of the third alkali metal layer.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

The presently disclosed methods can be used to manufacture alkali metal layers that can be used as alkali metal negative electrodes, such as lithium metal negative electrodes, in electrochemical cells that cycle alkali metal ions, such as lithium ions. In some examples, a laminate structure is prepared comprising a top layer, a bottom layer, and an alkali metal layer sandwiched between opposing facing surfaces of the top layer and the bottom layer. The laminate structure is heated to at least partially melt the alkali metal layer and form a volume of molten metal at the location of a peel site within the alkali metal layer. Then, the top layer and the bottom layer are peeled apart from each other such that the alkali metal layer splits internally at the location of the peel site and is simultaneously divided between the top layer and the bottom, into a first alkali metal layer disposed on the top layer and a second alkali metal layer disposed the bottom layer. Prior to formation of the laminate structure, a surface treatment layer may be formed on the opposing facing surfaces of the top layer and the bottom layer to enhance adhesion between the alkali metal layer and the facing surfaces of the top and bottom layers. When the top and bottom layers are peeled apart from each other, adhesive forces between the alkali metal layer and the facing surfaces of the top and bottom layers are greater than the cohesive forces within the volume of molten metal within the alkali metal layer. As such, when the top and bottom layers are peeled apart from each other, cohesive failure occurs within the alkali metal layer itself at the location of the peel site and adhesive failure does not occur along an interface between the alkali metal layer and the top layer or along an interface between the alkali metal layer and the bottom layer. In aspects, the top and bottom layers may be referred to as substrates, for example, for formation of the first and second alkali metal layers.

The presently disclosed methods may be used to form coatings or layers of alkali metal, e.g., lithium (Li), sodium (Na), and potassium (K). For simplicity, the presently disclosed methods will be described with respect to lithium.

Figure 1:
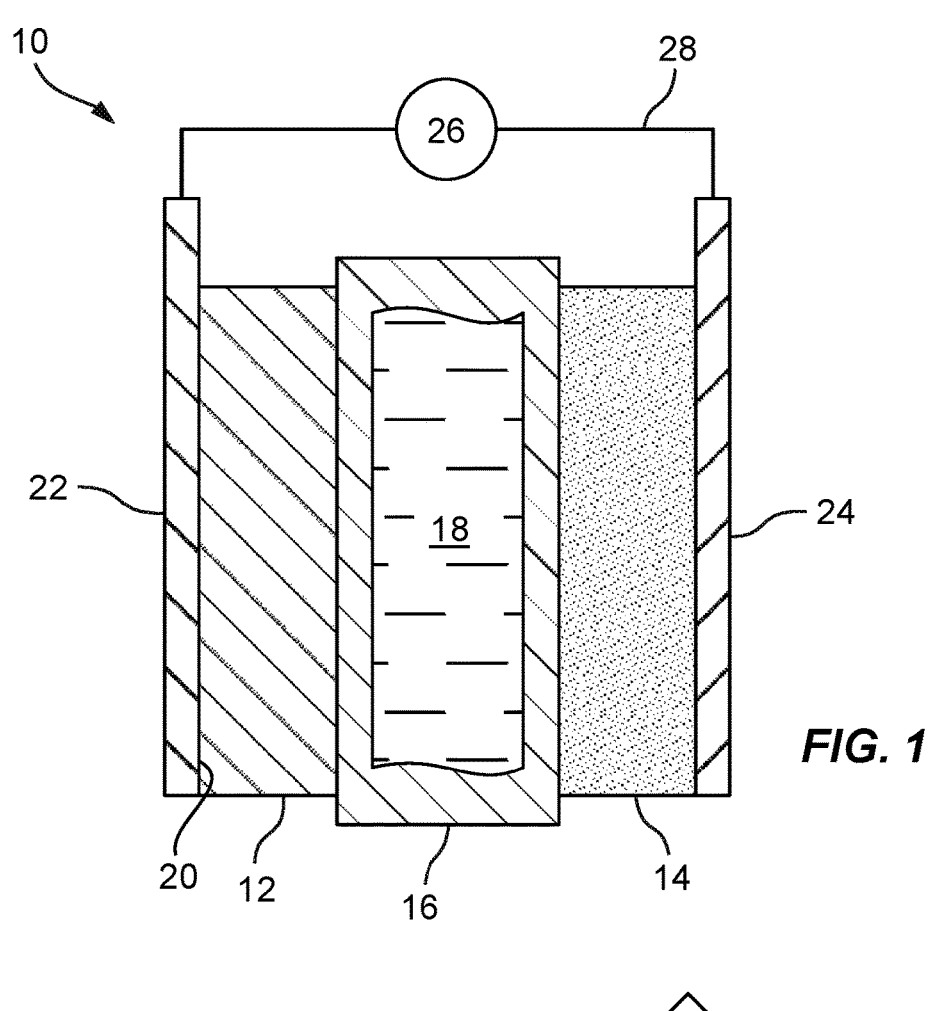
FIG. 1 is a schematic cross-sectional view of an electrochemical cell that cycles lithium ions, the electrochemical cell comprising a lithium metal negative electrode layer, a positive electrode layer, and a porous separator infiltrated with an electrolyte, wherein the lithium metal negative electrode layer is disposed on a facing surface of a negative electrode current collector.

FIG. 1 depicts a schematic side cross-sectional view of an electrochemical cell 10 that cycles lithium ions. The electrochemical cell 10 may be combined with one or more additional electrochemical cells to form a secondary lithium battery, such as a lithium metal battery (not shown). The electrochemical cell 10 comprises a lithium metal negative electrode layer 12, a positive electrode layer 14, a porous separator 16, and an electrolyte 18. The lithium metal negative electrode layer 12 is disposed on a major surface 20 of a negative electrode current collector 22 and the positive electrode layer 14 is disposed on a major surface of a positive electrode current collector 24. In practice, the negative and positive electrode current collectors 22, 24 may be electrically coupled to a power source or load 26 via an external circuit 28.

The lithium metal negative electrode layer 12 is electrochemically active and comprises a layer of lithium metal. The lithium metal negative electrode layer 12 may comprise elemental lithium (Li) or an alloy of lithium and one or more alloying elements. For example, the lithium metal negative electrode layer 12 may comprise, by weight, greater than 97% lithium or optionally greater than 99% lithium. The lithium metal negative electrode layer 12 may be substantially free of elements or compounds that undergo a reversible redox reaction with lithium during operation of the electrochemical cell 10. For example, the lithium metal negative electrode layer 12 may be substantially free of an intercalation host material that is formulated to undergo the reversible insertion or intercalation of lithium ions or an alloying material that can electrochemically alloy and form compound phases with lithium. In addition, the lithium metal negative electrode layer 12 may be substantially free of a conversion material or an alloy material that can electrochemically alloy and form compound phases with lithium. Some examples of materials that may be intentionally excluded from the lithium metal negative electrode layer 12 include carbon-based materials (e.g., graphite, activated carbon, carbon black, and graphene), silicon and silicon-based materials, tin oxide, aluminum, indium, zinc, cadmium, lead, germanium, tin, antimony, titanium oxide, lithium titanium oxide, lithium titanate, lithium oxide, metal oxides (e.g., iron oxide, cobalt oxide, manganese oxide, copper oxide, nickel oxide, chromium oxide, ruthenium oxide, and/or molybdenum oxide), metal phosphides, metal sulfides, and metal nitrides (e.g., phosphides, sulfides, and/or nitrides or iron, manganese, nickel, copper, and/or cobalt). The lithium metal negative electrode layer 12 may be substantially free of a polymeric binder. Some examples of polymeric binders that may be intentionally excluded from lithium metal negative electrode layer 12 include polyvinylidene fluoride (PVDF), ethylene propylene diene monomer (EPDM) rubber, styrene butadiene rubber (SBR), carboxymethyl cellulose (CMC), and polyacrylic acid.

The lithium metal negative electrode layer 12 may be disposed directly on the major surface 20 of the negative electrode current collector 22. The lithium metal negative electrode layer 12 may have a thickness of greater than zero micrometers, optionally greater than or equal to about 1 micrometer, or optionally greater than or equal to about 2 micrometers and less than or equal to about 20 micrometers, optionally less than or equal to about 10 micrometers, or optionally less than or equal to about 5 micrometers.

The positive electrode layer 14 is electrochemically active and is configured to store and release lithium ions during charge and discharge of the electrochemical cell 10.

The porous separator 16 physically and electrically isolates the negative electrode layer 12 and the positive electrode layer 14 from each other while permitting lithium ions to pass therethrough.

The electrolyte 18 is ionically conductive and provides a medium for the conduction of lithium ions between the negative electrode layer 12 and the positive electrode layer 14.

The negative and positive electrode current collectors 22, 24 may be in the form of thin and flexible porous or non-porous electrically conductive metal substrates. In aspects, the negative electrode current collector 22 may comprise copper (Cu), nickel (Ni), an iron (Fe) alloy (e.g., stainless steel), or titanium (Ti) and the positive electrode current collector 24 may comprise aluminum, nickel, or an iron alloy (e.g., stainless steel). Other electrically conductive metals may of course be used, if desired. The negative and positive electrode current collectors 22, 24 may have a thickness of greater than or equal to about 1 micrometer or optionally about 5 micrometers to less than or equal to about 15 micrometers or optionally about 100 micrometers.

The negative electrode current collector 22 optionally may comprise a surface treatment layer (not shown) disposed along the major surface 20 thereof. The optional surface treatment layer may help the lithium metal negative electrode layer 12 adhere to the major surface 20 of the negative electrode current collector 22, for example, by promoting the formation of strong chemical bonds between the negative electrode current collector 22 and the lithium metal negative electrode layer 12. In aspects, the surface treatment layer may be defined by a plurality of functional groups disposed along the major surface 20 of the negative electrode current collector 22. In such case, the plurality of functional groups may be covalently bonded to the bulk metal of the negative electrode current collector 22. For example, the surface treatment layer may be defined by a plurality of hydroxyl (—OH) groups disposed along the major surface 20 of the negative electrode current collector 22.

In some aspects, the surface treatment layer may comprise a different material than that of the bulk metal of the negative electrode current collector 22. In such case, the surface treatment layer may comprise a material that can form strong chemical bonds with the bulk metal of the negative electrode current collector 22 and with the lithium metal negative electrode layer 12. Examples of materials that may be disposed along the major surface 20 of the negative electrode current collector 22 to help for strong chemical bonds between the negative electrode current collector 22 and the lithium metal negative electrode layer 12 include metals, metal oxides, polymers, and combinations thereof. For example, in some aspects, the surface treatment layer disposed along the major surface 20 of the negative electrode current collector 22 may comprise tin (Sn), gold (Au), aluminum (Al), germanium (Ge), silicon (Si), a Sn—Li alloy, a Zn—Li alloy, zinc oxide, tin oxide, aluminum oxide, copper oxide, phthalic acid, citric acid, and/or a phenolic resin. The surface treatment layer may have a thickness of greater than or equal to about 10 nanometers to less than or equal to about 100 nanometers.

The surface treatment layer may be formed on the major surface 20 of the negative electrode current collector 22 by any suitable method and may depend upon the composition of the surface treatment layer. For example, the surface treatment layer may be deposited on the major surface 20 of the negative electrode current collector 22 via sputtering or by using a chemical vapor deposition technique. In aspects where the surface treatment layer comprises a metal oxide, the surface treatment layer may be deposited on the major surface 20 of the negative electrode current collector 22 using an atomic layer deposition technique.

Figure 2:
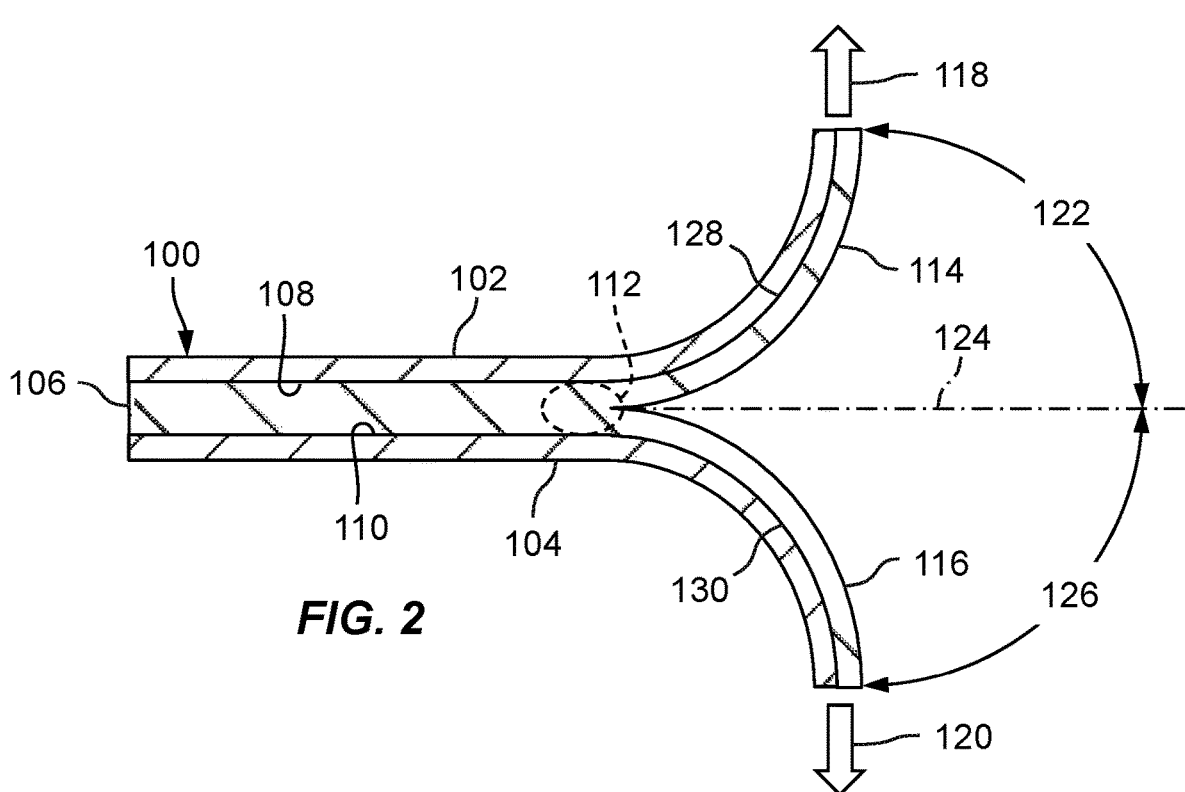
FIG. 2 is a schematic diagram of an example of a method for simultaneously forming alkali metal layers, such as lithium metal layers.

FIG. 2 depicts a method for simultaneously forming lithium metal layers, which may be used as lithium metal negative electrode layers in electrochemical cells that cycle lithium ions, such as the electrochemical cell 10. In aspects, the method may be used to form lithium metal negative electrode layers, such as the lithium metal negative electrode layer 12, on surfaces of negative electrode current collectors, such as the negative electrode current collector 22.

A laminate structure 100 may be provided. The laminate structure 100 may comprise a top layer 102, a bottom layer 104, and a lithium metal layer 106 sandwiched therebetween. The top layer 102 has a facing surface 108 and the bottom layer 104 has an opposing facing surface 110. The lithium metal layer 106 is between the opposing facing surfaces 108, 110 of the top layer 102 and the bottom layer 104. The lithium metal layer 106 may have a thickness of greater than or equal to about 5 micrometers, optionally about 10 micrometers, or optionally about 20 micrometers to less than or equal to about 100 micrometers, optionally about 50 micrometers, or optionally about 30 micrometers.

In aspects, the top layer 102 and/or the bottom layer 104 may be made of substantially the same material as that of the negative electrode current collector 22. In such case, the top layer 102 and/or the bottom layer 104 may be in the form of a thin metal foil. In aspects where the top layer 102 and/or the bottom layer 104 are in the form of a metal foil, the top layer 102 and/or the bottom layer 104 may have a thickness of greater than or equal to about 5 micrometers to less than or equal to about 20 micrometers. In other aspects, the top layer 102 and/or the bottom layer 104 may comprise a polymer. In such case, the top layer 102 and/or the bottom layer 104 may be in the form of a release film and may have a thickness of greater than or equal to about 5 micrometers to less than or equal to about 1 millimeter.

Like the negative electrode current collector 22, a surface treatment layer may be disposed along the opposing facing surface 108, 110 of the top layer 102 and/or the bottom layer 104 to help the lithium metal layer 106 adhere thereto. The surface treatment layer disposed on opposing facing surface 108, 110 of the top layer 102 and/or the bottom layer 104 may have substantially the same composition as the surface treatment layer disposed along the major surface 20 of the negative electrode current collector 22 and may be formed using substantially the same methods (e.g., sputtering, chemical vapor deposition, and/or atomic layer deposition).

The laminate structure 100 may be formed by positioning the lithium metal layer 106 between the opposing facing surfaces 108, 110 of the top and bottom layers 102, 104 and then laminating the top layer 102 and the bottom layer 104 together. Additionally or alternatively, the laminate structure 100 may be formed by applying a volume of lithium metal to the facing surface 108 of the top layer 102 and/or to the facing surface 110 of the bottom layer 104, and then laminating the top layer 102 and the bottom layer 104 together.

The laminate structure 100 may be heated to at least partially melt the lithium metal layer 106 and form a volume of molten lithium between the top layer 102 and the bottom layer 104. As shown in FIG. 2, the laminate structure 100 may be heated to form a volume of molten lithium at the location of a peel site 112 within the lithium metal layer 106. The peel site 112 may be located along a centerline of the lithium metal layer 106, midway between the top layer 102 and the bottom layer 104. In aspects, the peel site 112 may extend through the entire lithium metal layer 106, from the facing surface 108 of the top layer 102 to the facing surface 110 of the bottom layer 104. In such case, the volume of molten lithium formed within the lithium metal layer 106 may wet the opposing facing surfaces 108, 110 of the top layer 102 and the bottom layer 104.

The temperature at which the laminate structure 100 is heated to at least partially melt the lithium metal layer 106 may be referred to herein as a peel temperature and may comprise a temperature that is greater than the melting point of lithium (about 180 degrees Celsius, ° C.) and less than the melting point of the top and bottom layers 102, 104. For example, the laminate structure 100 may be heated to a peel temperature greater than or equal to about 180° C. or optionally about 185° C. to less than or equal to about 200° C. or optionally about 195° C. In aspects, the laminate structure 100 may be heated to a peel temperature of about 190° C.

As shown in FIG. 2, after the laminate structure 100 is heated to the peel temperature, the top layer 102 and the bottom layer 104 may be pulled or peeled apart from each other such that the lithium metal layer 106 splits internally at the location of the peel site 112 and is divided between the top layer 102 and the bottom layer 104. When the top layer 102 and the bottom layer 104 are peeled apart from each other, the lithium metal layer 106 may be split into a first lithium metal layer 114 disposed on the facing surface 108 of the top layer 102 and a second lithium metal layer 116 disposed on the facing surface 110 of the bottom layer 104. The thickness of the first and second lithium metal layers 114, 116 may be less than that of the lithium metal layer 106. For example, the thickness of the first and second lithium metal layers 114, 116 may be greater than or equal to about 30% to less than or equal to about 70% of the thickness of the lithium metal layer 106.

The top layer 102 and the bottom layer 104 may be peeled apart from each other by applying a tensile force to the top layer 102 in a direction away from the bottom layer 104 and/or by applying a tensile force to the bottom layer 104 in a direction away from the top layer 102. For example, the top layer 102 and the bottom layer 104 may be peeled apart from each other by applying a tensile force to the top layer 102 in the direction of arrow 118 and/or by applying a tensile force to the bottom layer 104 in the direction of arrow 120. A tensile force may be applied to the top layer 102 at an angle 122 greater than 0 degrees and less than or equal to 180 degrees with respect to a plane defined by a central longitudinal axis 124 of the lithium metal layer 106. Additionally or alternatively, a tensile force may be applied to the bottom layer 104 at an angle 126 greater than 0 degrees and less than or equal to 180 degrees with respect to a plane defined by the central longitudinal axis 124 of the lithium metal layer 106. In FIG. 2, a tensile force is applied to the top layer 102 in the direction of arrow 118 at an angle 122 of about 90 degrees with respect to the central longitudinal axis 124 of the lithium metal layer 106 and a tensile force is applied to the bottom layer 104 at an angle 126 of about 90 degrees with respect to the central longitudinal axis 124 of the lithium metal layer 106.

When the top layer 102 and the bottom layer 104 are peeled apart from each other, the adhesive forces between the lithium metal layer 106 and the opposing facing surfaces 108, 110 of the top and bottom layers 102, 104 are greater than the cohesive forces within the volume of molten lithium at the location of the peel site 112 within the lithium metal layer 106. As such, when the top layer 102 and the bottom layer 104 are peeled apart from each other, cohesive failure occurs within the lithium metal layer 106 itself at the location of the peel site 112 and adhesive failure does not occur along an interface 128 between the lithium metal layer 106 and the top layer 102 or along an interface 130 between the lithium metal layer 106 and the bottom layer 104. As shown in FIG. 2, when the top layer 102 and the bottom layer 104 are peeled apart from each other, cohesive failure may occur within the lithium metal layer 106 along the central longitudinal axis 124 thereof. In other words, when the top layer 102 and the bottom layer 104 are peeled apart from each other, the lithium metal layer 106 does not delaminate from the facing surface 108 of the top layer 102 or from the facing surface 110 of the bottom layer 104. Without intending to be bound by theory, it is believed that, when the surface treatment layer is formed on the facing surface 108 of the top layer 102 and/or on the facing surface 110 of the bottom layer 104, the surface treatment layer may enhance the adhesive forces between the lithium metal layer 106 and the top layer 102 and/or the bottom layer 104, which may help prevent delamination of the lithium metal layer 106 from the top layer 102 and/or the bottom layer 104 during the peeling process.

In practice, when the top layer 102 and the bottom layer 104 are peeled apart from each other, the laminate structure 100 may be oriented so that the central longitudinal axis 124 of the lithium metal layer 106 is substantially parallel to the direction of gravitational force or so that the central longitudinal axis 124 of the lithium metal layer 106 extends at a desired angle with respect to the direction of gravitational force. For example, it may be desirable for the central longitudinal axis 124 of the lithium metal layer 106 to extend at an angle of greater than or equal to 90 degrees to less than or equal to 270 degrees with respect to the direction of gravitational force.

In aspects, it may be desirable for the laminate structure 100 to be oriented so that, when the top layer 102 and the bottom layer 104 are peeled apart from each other, the facing surfaces 108, 110 of the top and bottom layers 102, 104 open away from the direction of gravitational force. Without intending to be bound by theory, it is believed that orienting the laminate structure 100 such that the facing surfaces 108, 110 of the top and bottom layers 102, 104 open away from the direction of gravitational force when the top layer 102 and the bottom layer 104 are peeled apart from each other may help equally distribute the molten lithium between the top and bottom layers 102, 104 and uniformly distributed the molten lithium over the facing surfaces 108, 110 of the top and bottom layers 102, 104. In aspects, it may be desirable for the laminate structure 100 to be oriented so that, when the top layer 102 and the bottom layer 104 are peeled apart from each other, the central longitudinal axis 124 of the lithium metal layer 106 extends at an angle of about 180 degrees with respect to the direction of gravitational force and the facing surfaces 108, 110 of the top and bottom layers 102, 104 open away from the direction of gravitational force.

In aspects where the top layer 102 and/or bottom layer 104 are in the form of a metal foil having substantially the same composition as that of the negative electrode current collector 22, the top layer 102 and/or bottom layer 104 may be cut or otherwise formed into the shape of the negative electrode current collector 22 and assembled into an electrochemical cell that cycles lithium ions, such as the electrochemical cell 10, with the top layer 102 (or the bottom layer 104) defining the negative electrode current collector 22 and the first lithium metal layer 114 (or the second lithium metal layer 116) defining the lithium metal negative electrode layer 12.

In aspects where the top layer 102 and/or bottom layer 104 are in the form of a release film, the first lithium metal layer 114 (or the second lithium metal layer 116) may be transferred from the top layer 102 (or the bottom layer 104) to a metal substrate, which may be cut or otherwise formed into the shape of the negative electrode current collector 22 and assembled into an electrochemical cell that cycles lithium ions, such as the electrochemical cell 10, with the metal substrate defining the negative electrode current collector 22 and the first lithium metal layer 114 (or the second lithium metal layer 116) defining the lithium metal negative electrode layer 12.

Figure 3:
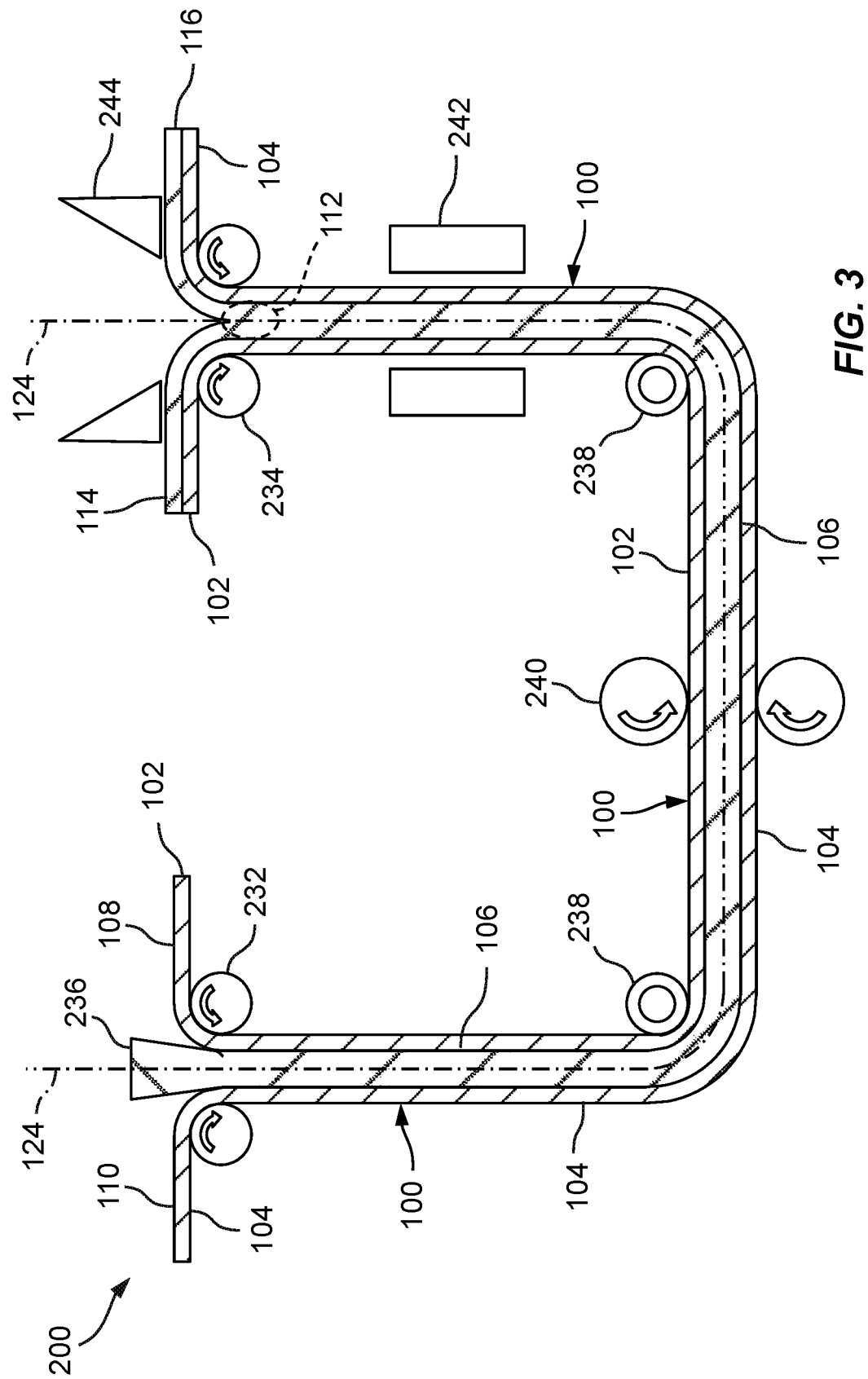
FIG. 3 is a schematic diagram of an example of a method for simultaneously forming alkali metal layers, such as lithium metal layers, using a roll-to-roll production technique.

Referring now to FIG. 3, the method described above with respect to FIG. 2 can be adapted to roll-to-roll production. FIG. 3 is a schematic diagram of a roll-to-roll system 200 for forming the laminate structure 100 comprising the top layer 102, the bottom layer 104, and the lithium metal layer 106, for heating the laminate structure 100 to the peel temperature, and for peeling the top layer 102 and the bottom layer 104 apart from each other to form the first lithium metal layer 114 on the facing surface 108 of the top layer 102 and the second lithium metal layer 116 on the facing surface 110 of the bottom layer 104. In FIG. 3, the top layer 102 and the bottom layer 104 are each in the form of a continuous web or sheet that extends along a transport path between inlet rollers 232 and outlet rollers 234, with the lithium metal layer 106 extending continuously between the top layer 102 and the bottom layer 104 along the transport path between the inlet rollers 232 and the outlet rollers 234. One or more guide rollers 238 optionally may be used to direct the laminate structure 100 along the transport path between inlet rollers 232 and outlet rollers 234.

The laminate structure 100 may be formed by applying a volume of lithium metal to the facing surface 108, 110 of the top layer 102 and/or the bottom layer 104 and then laminating the top layer 102 and the bottom layer 104 together. As shown in FIG. 3, the laminate structure 100 may be formed by continuously supplying a stream of lithium metal 236 between the facing surface 108 of the top layer 102 and the facing surface 110 of the bottom layer 104 upstream of the inlet rollers 232. Then, the top layer 102 and the bottom layer 104 may be laminated together by simultaneously passing the top layer 102, the bottom layer 104, and the lithium metal 236 between the inlet rollers 232. As the top and bottom layers 102, 104 are passed between the inlet rollers 232, the lithium metal 236 is sandwiched therebetween, forming the lithium metal layer 106. The lithium metal 236 may be in solid phase or in liquid phase during the lamination process. The inlet rollers 232 may be spaced apart by a gap and the thickness of the lithium metal layer 106 may be controlled or adjusted by controlling or adjusting the width of the gap between the inlet rollers 232 and the pressure applied to the top and bottom layers 102, 104 by the inlet rollers 232. The flow rate of the stream of lithium metal 236 supplied between the top and bottom layers 102, 104 and/or the speed at which the laminate structure 100 is transported between the inlet and outlet rollers 232, 234 (e.g., the speed with which the inlet and outlet rollers 232, 234 are rotated) may be controlled or adjusted to control the volume of lithium metal in the laminate structure 100.

The temperature of the laminate structure 100 may be controlled or adjusted at various stages or locations within the roll-to-roll system 200. It may be desirable to control or adjust the temperature of the laminate structure 100 at various stages or locations within the roll-to-roll system 200, for example, to control or adjust the viscosity or other rheological properties of the lithium metal 236 and/or the lithium metal layer 106. The laminate structure 100 may be heated as the laminate structure 100 is passed between the inlet rollers 232 and/or the outlet rollers 234 and/or as the laminate structure 100 is transported between the inlet and outlet rollers 232, 234. As shown in FIG. 3, in some aspects, the laminate structure 100 may be heated by conduction by passing the laminate structure 100 over or between one or more heated rollers 240. Additionally or alternatively, the laminate structure 100 may be heated by convection and/or radiation by passing the laminate structure 100 between or adjacent one or more heaters 242. The temperature of the first lithium metal layer 114 and/or the second lithium metal layer 116 may be controlled or adjusted downstream of the outlet rollers 234 by any suitable means.

The laminate structure 100 may be heated to the peel temperature prior to or at the same time as the laminate structure is passed between the outlet rollers 234 to at least partially melt the lithium metal layer 106 and form a volume of molten lithium at the location of the peel site 112 within the lithium metal layer 106. After the laminate structure 100 is heated to the peel temperature, the top layer 102 and the bottom layer 104 may be pulled apart or peeled apart from each other such that the lithium metal layer 106 splits internally at the location of the peel site 112 and is divided between the top layer 102 and the bottom layer 104. After the lithium metal layer 106 is split into the first lithium metal layer 114 and the second lithium metal layer 116, an air blade 244 or other suitable device may be used to control or adjust the thickness and/or uniformity of the first and second lithium metal layers 114, 116.

In FIG. 3, the inlet rollers 232 and the outlet rollers 234 and the laminate structure 100 are arranged such that the facing surfaces 108, 110 of the top and bottom layers 102, 104 open away from a direction of gravitational force. To accomplish this, the transport path followed by the laminate structure 100 between inlet rollers 232 and outlet rollers 234 may include at least two vertical sections and at least one horizontal section.

Figure 4:
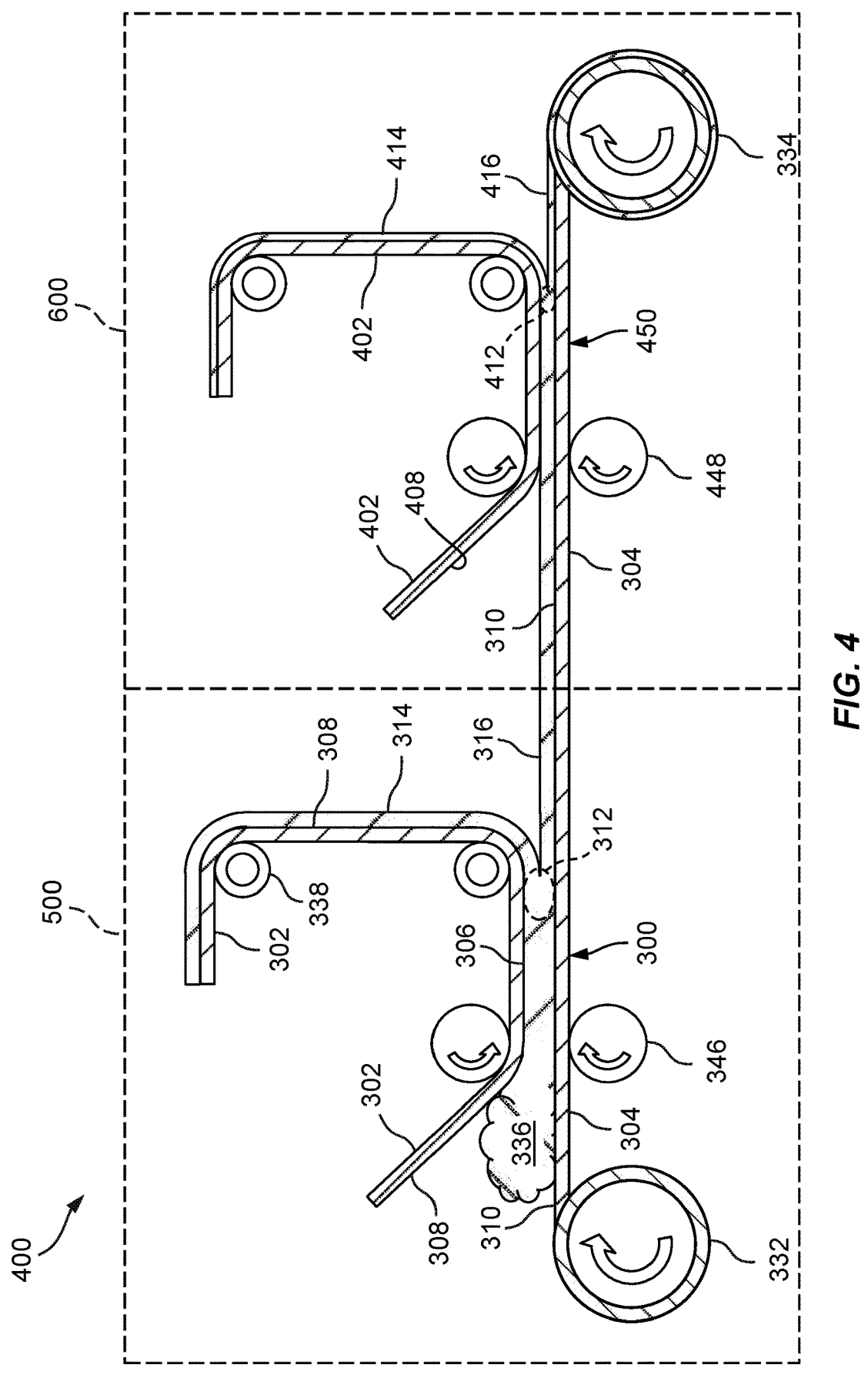
FIG. 4 is a schematic diagram of an example of a method for forming alkali metal layers, such as lithium metal layers, using a roll-to-roll production technique.

FIG. 4 is a schematic diagram of a roll-to-roll system 400 for forming alkali metal layers including a first stage 500 and a second stage 600, which may be performed subsequent to the first stage 500. In the first stage 500, a first laminate structure 300 is formed. The first laminate structure 300 and the system 400 and are similar in many respects to the laminate structure 100 discussed above with respect to FIGS. 2 and 3 and to the system 200 discussed above with respect to FIG. 3, and like subject matter between the embodiments may not be repeated here.

The first laminate structure 300 may be formed by positioning a facing surface 308 of a top layer 302 opposite a facing surface 310 of a bottom layer 304, applying a volume of lithium metal 336 between the facing surface 308 of the top layer 302 and the facing surface 310 of the bottom layer 304, and then laminating the top layer 302 and the bottom layer 304 together. The top layer 302 and the bottom layer 304 may be laminated together by simultaneously passing the top layer 302, the bottom layer 304, and the lithium metal 336 between a first set of rollers 346. As the top and bottom layers 302, 304 are passed between the first set of rollers 346, the lithium metal 336 is sandwiched therebetween, forming a first lithium metal layer 306 between the top and bottom layers 302, 304.

The first laminate structure 300 is heated in the first stage 500 to a peel temperature to at least partially melt the first lithium metal layer 306 and form a volume of molten lithium at the location of a peel site 312 between the top layer 302 and the bottom layer 304 within the first lithium metal layer 306. Then, the top layer 302 and the bottom layer 304 are peeled apart from each other such that the first lithium metal layer 306 splits internally at the location of the peel site 312 and is divided into a second lithium metal layer 314 disposed on the facing surface 308 of the top layer 302 and a third lithium metal layer 316 disposed on the facing surface 310 of the bottom layer 304.

In the second stage 600, a second laminate structure 450 is formed. The second laminate structure 450 is similar in many respects to the laminate structures 100, 300 discussed above with respect to FIGS. 2 and 3, and like subject matter between the embodiments may not be repeated here. The second laminate structure 450 is formed by positioning a facing surface 408 of a third layer 402 opposite the third lithium metal layer 316 and opposite the facing surface 310 of the bottom layer 304. Then, the third layer 402 and the bottom layer 304 are laminated together by simultaneously passing the third layer 402, the bottom layer 304, and the third lithium metal layer 316 between a second set of rollers 448. As the third layer 402 and the bottom layer 304 are passed between the second set of rollers 448, the third lithium metal layer 316 is sandwiched therebetween.

The second laminate structure 450 is heated in the second stage 600 to a peel temperature to at least partially melt the third lithium metal layer 316 and form a volume of molten lithium at the location of a peel site 412 between the third layer 402 and the bottom layer 304 within the third lithium metal layer 316. Then, the third layer 402 and the bottom layer 304 are peeled apart from each other such that the third lithium metal layer 316 splits internally at the location of the peel site 412 and is divided into a fourth lithium metal layer 414 disposed on the facing surface 408 of the third layer 402 and a fifth lithium metal layer 416 disposed on the facing surface 310 of the bottom layer 304.

In FIG. 4, the bottom layer 304 is in the form of a continuous web or sheet that extends along a transport path between inlet rollers 332 and outlet rollers 334. The top layer 302 and the third layer 402 are likewise in the form of continuous webs or sheets. However, the top layer 302 and the third layer 402 only extend partway between the inlet rollers 332 and the outlet rollers 334. In particular, after the top layer 302 and the bottom layer 304 are peeled apart from each other in the first stage 500, the top layer 302 may be directed away from the bottom layer 304, for example, by one or more guide rollers 338, while the bottom layer 304 is transported to the second stage 600.

The second stage 600 may be performed to reduce the thickness and/or increase the smoothness of a lithium metal layer disposed on a facing surface of a substrate. For example, as shown in FIG. 4, the second stage 600 may be performed to reduce the thickness and/or increase the smoothness of the third lithium metal layer 316 disposed on the facing surface 310 of the bottom layer 304. In such case, prior to forming the second laminate structure 450, the facing surface 408 of the third layer 402 may be substantially bare and may not include an overlying layer. For example, the facing surface 408 of the third layer 402 may not include an overlying alkali metal layer. As such, when the third layer 402 and the bottom layer 304 are peeled apart from each other, the third lithium metal layer 316 will be divided between the third layer 402 and the bottom layer 304 and the thickness of the fourth and fifth lithium metal layers 414, 416 may be less than that of the third lithium metal layer 316.

Starting with a relatively thick alkali metal layer (e.g., the lithium metal layer 106 or 306), the thickness of the subsequently formed layers 114, 116, 314, 316, 414, and/or 416 may be controlled or adjusted by controlling or adjusting various operating parameters, for example, the peel temperature and/or the rate the layers 102, 104, 302, 304, 402 are peeled apart from each other. In aspects, it may be desirable for the thickness of the first and second lithium metal layers 114, 116 to each be about 50% of the thickness of the lithium metal layer 106. In other aspects, it may be desirable for the thickness of the first lithium metal layer 114 to be less than 50% of the thickness of the lithium metal layer 106 and for the thickness of the second lithium metal layer 116 to be greater than 50% of the thickness of the lithium metal layer 106, or vice versa. For example, the thickness of the first lithium metal layer 114 and the thickness of the second lithium metal layer 116 each may be greater than or equal to about 25% to less than or equal to about 75% of the thickness of the lithium metal layer 106. In aspects, it may be desirable for the thickness of the second and third lithium metal layers 314, 316 to each be about 50% of the thickness of the first lithium metal layer 306. In other aspects, it may be desirable for the thickness of the second lithium metal layer 314 to be less than 50% of the thickness of the first lithium metal layer 306 and for the thickness of the third lithium metal layer 316 to be greater than 50% of the thickness of the first lithium metal layer 306, or vice versa. For example, the thickness of the second lithium metal layer 314 and the thickness of the third lithium metal layer 316 each may be greater than or equal to about 25% to less than or equal to about 75% of the thickness of the first lithium metal layer 306.

In aspects, it may be desirable to control and/or adjust the operating parameters such that the thickness of the second lithium metal layer 314 is substantially the same as that of the fourth and fifth lithium metal layers 414, 416. In such case, the thickness of the second lithium metal layer 314 to be about one-third (about 33%) of the thickness of the first lithium metal layer 306 and the thickness of the fourth and fifth lithium metal layers 414, 416 each may be about 50% of the thickness of the third lithium metal layer 316.

In aspects, after the first stage 500, the first lithium metal layer 306 may have a thickness of greater than or equal to about 15 micrometers and less than or equal to about 25 micrometers and the second and third alkali metal layers 314, 316 each may have a thickness of greater than or equal to about 1 micrometer or optionally about 5 micrometers to less than or equal to about 12.5 micrometers or optionally about 6.25 micrometers. After the second stage 600, the fourth and fifth alkali metal layers 414, 416 each may have a thickness of greater than or equal to about 1 micrometer to less than or equal to about 6.25 micrometers.

In aspects, as shown in FIG. 4, the second stage 600 may be performed after the first stage 500. In other aspects, the second stage 600 may be performed without first having performed the first stage 500. For example, the second stage 600 may be performed to reduce the thickness of a lithium metal layer disposed on a facing surface of a substrate, regardless of how the lithium metal layer came to be disposed on the facing surface of the substrate. The second stage 600 may be repeated until a lithium metal layer having a desired thickness is formed on the facing surface 310 of the bottom layer 304.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," "top," "bottom," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures. The terms "top" and "bottom" are used herein to describe various layers, but the orientation of such layers should not be limited by these terms, unless otherwise indicated. These terms may be only used to distinguish one layer from another layer.

Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification are to be understood as being modified in all instances by the term "about" whether or not "about" actually appears before the numerical value. Numerical values of parameters in the appended claims are to be understood as being modified by the term "about" only when such term appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight. When a composition or material is referred to as being "substantially free" of a substance, the composition or material may comprise, by weight, less than 5%, optionally less than 3%, optionally less than 1%, or optionally less than 0.1% of the substance.

As used herein, the term "metal" may refer to a pure elemental metal or to an alloy of an elemental metal and one or more other metal or nonmetal elements (referred to as "alloying" elements). The alloying elements may be selected to impart certain desirable properties to the alloy that are not exhibited by the base metal element.

What is claimed is:

1. A method for simultaneously forming alkali metal layers, the method comprising:

heating a laminate structure to a peel temperature, the laminate structure comprising a top layer, a bottom layer, and an alkali metal layer sandwiched between opposing facing surfaces of the top layer and the bottom layer, wherein the laminate structure is heated to at least partially melt the alkali metal layer and form a volume of molten alkali metal at a peel site within the alkali metal layer; and peeling the top layer and the bottom layer apart from each other such that the alkali metal layer splits internally at the peel site and is divided between the top layer and the bottom layer.

2. The method of claim 1, wherein the laminate structure is heated such that the volume of molten alkali metal formed within the alkali metal layer extends through the entire alkali metal layer and wets the opposing facing surfaces of the top layer and the bottom layer.

3. The method of claim 1, wherein the alkali metal layer comprises lithium, and wherein the peel temperature is greater than or equal to about 180 degrees Celsius and less than or equal to about 200 degrees Celsius.

4. The method of claim 1, wherein, when the top layer and the bottom layer are peeled apart from each other, adhesive forces between the alkali metal layer and the opposing facing surfaces of the top layer and the bottom layer are greater than cohesive forces within the volume of molten alkali metal such that cohesive failure occurs within the alkali metal layer itself at the peel site and adhesive failure does not occur along an interface between the alkali metal layer and the top layer or along an interface between the alkali metal layer and the bottom layer.

5. The method of claim 1, wherein at least one of the top layer or the bottom layer is in the form of a foil comprising a metal selected from the group consisting of copper, nickel, titanium, and stainless steel.

6. The method of claim 1, wherein at least one of the top layer or the bottom layer is in the form of a release film comprising a polymer.

7. The method of claim 1, further comprising:

forming a surface treatment layer on the facing surface of at least one of the top layer or the bottom layer, wherein the surface treatment layer comprises metal, a metal oxide, a polymer, or a combination thereof.

8. The method of claim 1, further comprising:

applying a volume of alkali metal to the facing surface of the top layer and/or the bottom layer; and laminating the top layer and the bottom layer together to form the laminate structure, wherein the top layer and the bottom layer are laminated together by simultaneously passing the top layer, the bottom layer, and the volume of alkali metal between rollers spaced apart by a gap.

9. The method of claim 8, wherein the volume of alkali metal is in solid phase when the top layer and the bottom layer are laminated together.

10. The method of claim 1, wherein, when the alkali metal layer splits internally at the peel site, the alkali metal layer is simultaneously divided into a first alkali metal layer disposed on the top layer and a second alkali metal layer disposed on the bottom layer.

11. The method of claim 10, wherein the top layer and the bottom layer each have a thickness of greater than or equal to about 5 micrometers and less than or equal to about 30 micrometers, the alkali metal layer has a thickness of greater than or equal to about 1 micrometer and less than or equal to about 60 micrometers, and the first and second alkali metal layers each have a thickness of greater than or equal to about 1 micrometer and less than or equal to about 30 micrometers.

12. The method of claim 1, wherein, when the top layer and the bottom layer are peeled apart from each other, the laminate structure is oriented such that the opposing facing surfaces of the top layer and the bottom layer open away from a direction of gravitational force.

13. The method of claim 1, wherein the top layer and the bottom layer are each a continuous web extending between inlet rollers and outlet rollers, and wherein the method further comprises:

continuously moving the top layer and the bottom layer between the inlet rollers and the outlet rollers.

14. A method for forming alkali metal layers, the method comprising:

forming a first laminate structure by:

positioning a facing surface of a top layer opposite a facing surface of a bottom layer, applying a volume of alkali metal between the facing surfaces of the top layer and the bottom layer; and simultaneously passing the top layer, the bottom layer, and the volume of alkali metal between a first set of rollers to transform the volume of alkali metal into a first alkali metal layer sandwiched between the facing surfaces of the top layer and the bottom layer;

heating the first laminate structure to a peel temperature to at least partially melt the first alkali metal layer and form a volume of molten alkali metal at a first peel site disposed between the top layer and the bottom layer within the first alkali metal layer; and peeling the top layer and the bottom layer apart from each other such that the first alkali metal layer splits internally at the first peel site and is divided into a second alkali metal layer disposed on the top layer and a third alkali metal layer disposed on the bottom layer.

15. The method of claim 14, wherein at least one of the top layer or the bottom layer is in the form of a foil comprising a metal selected from the group consisting of copper, nickel, titanium, and stainless steel, and wherein the first alkali metal layer comprises lithium, and wherein the peel temperature is greater than or equal to about 180 degrees Celsius and less than or equal to about 200 degrees Celsius.

16. The method of claim 14, further comprising:

forming a second laminate structure by:

positioning a facing surface of a third layer opposite the third alkali metal layer and the facing surface of the bottom layer; and simultaneously passing the third layer, the third alkali metal layer, and the bottom layer between a second set of rollers such that the third alkali metal layer is sandwiched between the facing surface of the third layer and the facing surface of the bottom layer;

heating the second laminate structure to the peel temperature to at least partially melt the third alkali metal layer and form a volume of molten alkali metal at a second peel site between the third layer and the bottom layer within the third alkali metal layer; and peeling the third layer and the bottom layer apart from each other such that the third alkali metal layer splits internally at the second peel site and is divided into a fourth alkali metal layer disposed on the third layer and a fifth alkali metal layer disposed on the bottom layer.

17. The method of claim 16, wherein, prior to forming the second laminate structure, the facing surface of the third layer is substantially bare and does not include an overlying alkali metal layer, and wherein a thickness of the third alkali metal layer is greater than a thickness of the fourth alkali metal layer and a thickness of the fifth alkali metal layer.

18. The method of claim 17, wherein the top layer, the bottom layer, and the third layer are each a continuous web extending at least partway between inlet rollers and outlet rollers, and wherein the method further comprises:

continuously moving the bottom layer between the inlet rollers and the outlet rollers.

19. A method for forming alkali metal layers, the method comprising:

(a) forming a first laminate structure by:

positioning a facing surface of a top layer opposite a facing surface of a bottom layer, wherein a first alkali metal layer is disposed along the facing surface of the bottom layer, and wherein the facing surface of the top layer is substantially bare and does not include an overlying alkali metal layer; and simultaneously passing the top layer, the first alkali metal layer, and the bottom layer between a first set of rollers such that the first alkali metal layer is sandwiched between the facing surface of the top layer and the facing surface of the bottom layer;

(b) heating the first laminate structure to a peel temperature to at least partially melt the first alkali metal layer and form a volume of molten alkali metal at a peel site between the top layer and the bottom layer within the first alkali metal layer; and (c) peeling the top layer and the bottom layer apart from each other such that the first alkali metal layer splits internally at the peel site and is divided into a second alkali metal layer disposed on the top layer and a third alkali metal layer disposed on the bottom layer, wherein the second alkali metal layer and the third alkali metal layer each have a thickness of greater than or equal to about 25% to less than or equal to about 75% of the thickness of the first alkali metal layer.

20. The method of claim 19, further comprising:

(d) forming a second laminate structure by:

positioning a facing surface of a third layer opposite the third alkali metal layer and the facing surface of the bottom layer, wherein the facing surface of the third layer is substantially bare and does not include an overlying alkali metal layer; and simultaneously passing the third layer, the third alkali metal layer, and the bottom layer between a second set of rollers such that the third alkali metal layer is sandwiched between the facing surface of the third layer and the facing surface of the bottom layer;

(e) heating the second laminate structure to the peel temperature to at least partially melt the third alkali metal layer and form a volume of molten alkali metal at a second peel site between the third layer and the bottom layer within the third alkali metal layer; and peeling the third layer and the bottom layer apart from each other such that the third alkali metal layer splits internally at the second peel site and is divided into a fourth alkali metal layer disposed on the third layer and a fifth alkali metal layer disposed on the bottom layer, wherein the fourth alkali metal layer and the fifth alkali metal layer each have a thickness of greater than or equal to about 25% to less than or equal to about 75% of the thickness of the third alkali metal layer.

\* \* \* \* \*